United States Patent

Iwata

[15] 3,697,015

[45] Oct. 10, 1972

[54] AUTOMATIC OPERATING CONTROL FOR MAGNETIC RECORDING AND REPRODUCING APPARATUS

[72] Inventor: Mitsuo Iwata, Yokohama, Japan

[73] Assignee: Victor Company of Japan, Ltd., Yokohama, Kanagawa-ken, Japan

[22] Filed: Jan. 26, 1971

[21] Appl. No.: 109,804

[30] Foreign Application Priority Data

Jan. 27, 1970 Japan ........................45/7823

[52] U.S. Cl.....................242/186, 242/206, 274/4 D

[51] Int. Cl. .....B65h 59/38, G03b 1/04, G11b 15/32

[58] Field of Search..............242/186–191, 201–204, 242/206–208; 179/100.2 R; 274/4 D, 11 D, 11 E

[56] References Cited

UNITED STATES PATENTS 2,958,476 11/1960 Montgomery.............242/202

2,983,794 5/1961 Shields................179/100.2 R 3,080,456 3/1963 Osborne et al......179/100.2 R 3,105,645 10/1963 Rost..........................242/191

*Primary Examiner*—Leonard D. Christian

*Attorney*—Holman & Stern

[57] ABSTRACT

An automatic operating apparatus for magnetic recording and reproducing apparatus in which there is provided a cam integrally revolving by revolution of an operating knob, means for engaging a pinch roller cooperating with a capstan and an idler cooperating with a reel disk in a waiting position in association with the revolution of the cam, and means for releasing the pinch roller and idler from the waiting position by closing of a timer switch at a pre-set time thus starting an automatic recording or reproducing operation. There is further provided means for detecting the presence or absence of a magnetic tape and means for returning the cam to the stop position thereby stopping the recording or reproducing operation.

6 Claims, 4 Drawing Figures

INVENTOR

Mitsuo Iwata

BY Holman & Stern

ATTORNEYS

INVENTOR

BY

ATTORNEYS

INVENTOR

Mitsuo Iwata

BY [signature]

ATTORNEYS

PATENTED OCT 10 1972

3,697,015

INVENTOR

Mitsuo Iwata

BY [signature]

ATTORNEYS

AUTOMATIC OPERATING CONTROL FOR MAGNETIC RECORDING AND REPRODUCING APPARATUS

BACKGROUND OF THE INVENTION

This invention relates to an automatic operating apparatus for a magnetic recording and reproducing apparatus and more particularly to an automatic operating apparatus for automatically starting or stopping the tape recorder.

Recording of FM or AM broadcasting programs on a magnetic tape by a tape recorder is generally performed so as to listen to the programs at a desired time. This recording operation requires the operator to start or stop the tape recorder manually at the start or finish of the desired broadcasting program. The magnetic tape, when it is wholly wound up on a takeup reel, must be stopped by a manual operation. The operator must always attend to the tape recorder during the recording and reproducing operation. The circumstance is very inconvenient because it is impossible to perform the above described recording satisfactorily when the operator is absent from the place of the tape recorder though he wants to record a desired program.

Thus, it is necessary to provide a tape recorder of a construction adapted to automatically start the recording at a preset time and also automatically stop it at the end of recording. It is further required to provide an automatic operating apparatus having a construction to permit a tape recorder to automatically start reproducing at a preset time and automatically stop at the end of reproducing.

SUMMARY OF THE INVENTION

Therefore, it is a general object of the present invention to provide a novel and useful automatic operating apparatus for a magnetic recording and reproducing apparatus satisfying the above described requirements.

Another object of the invention is to provide an automatic operating apparatus which can perform an automatic operation to start a magnetic recording and reproducing apparatus at a preset time as well as to stop the apparatus automatically after running of a tape.

Still another object of the invention is to provide an automatic operating apparatus which permits an automatic recording of a broadcasting program in a magnetic recording and reproducing apparatus at a preset time even during absence of the operator and an automatic stopping of the apparatus after recording.

A further object of the invention is to provide an automatic operating apparatus which can perform an automatic starting and stopping of recording by a relatively simple construction in a magnetic recording and reproducing apparatus of the simple type using only one motor.

A further object of the invention is to provide an automatic operating apparatus for a magnetic recording and reproducing apparatus which can part a pinch roller from a capstan at the time of automatic stopping. This operation avoids the deformation of the pinch roller which occurs when a portion of the pinch roller compresses for a long time against the capstan which is not rotated.

Still further object of the invention is to provide an automatic operating apparatus which can automatically stop a magnetic recording and reproducing apparatus even at the end of fast forwarding and rewinding of a tape and at the time of cutting of the tape, as well as at the end of tape recording and reproducing.

These and other objects and features of the invention will become apparent from the description as hereinafter set forth with reference to the accompanying drawings, in which:

DETAILED DESCRIPTION OF THE DRAWINGS

Figure 1:
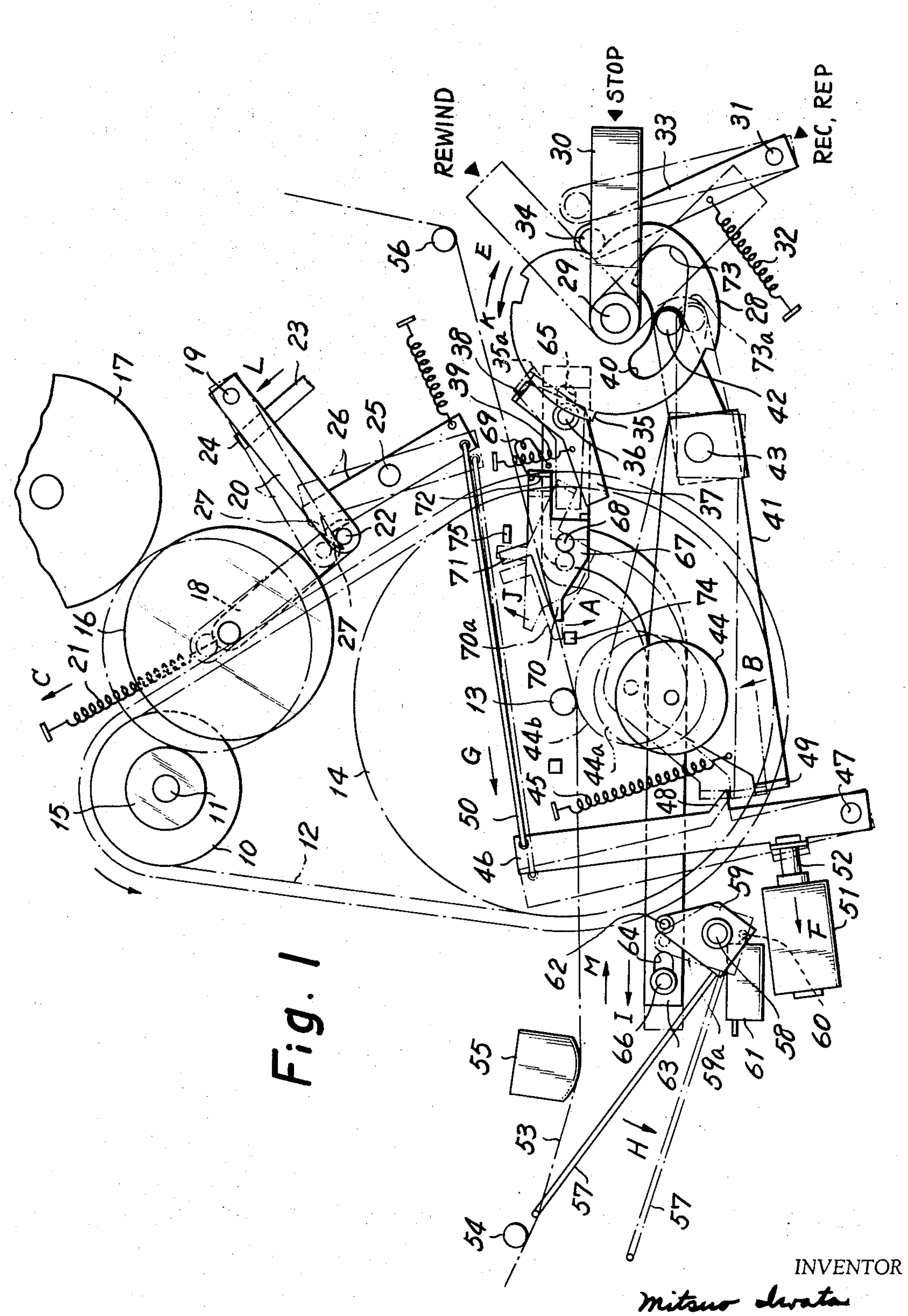
FIG. 1 is a plan view of an embodiment of an automatic operating apparatus according to the invention.
Figure 2:
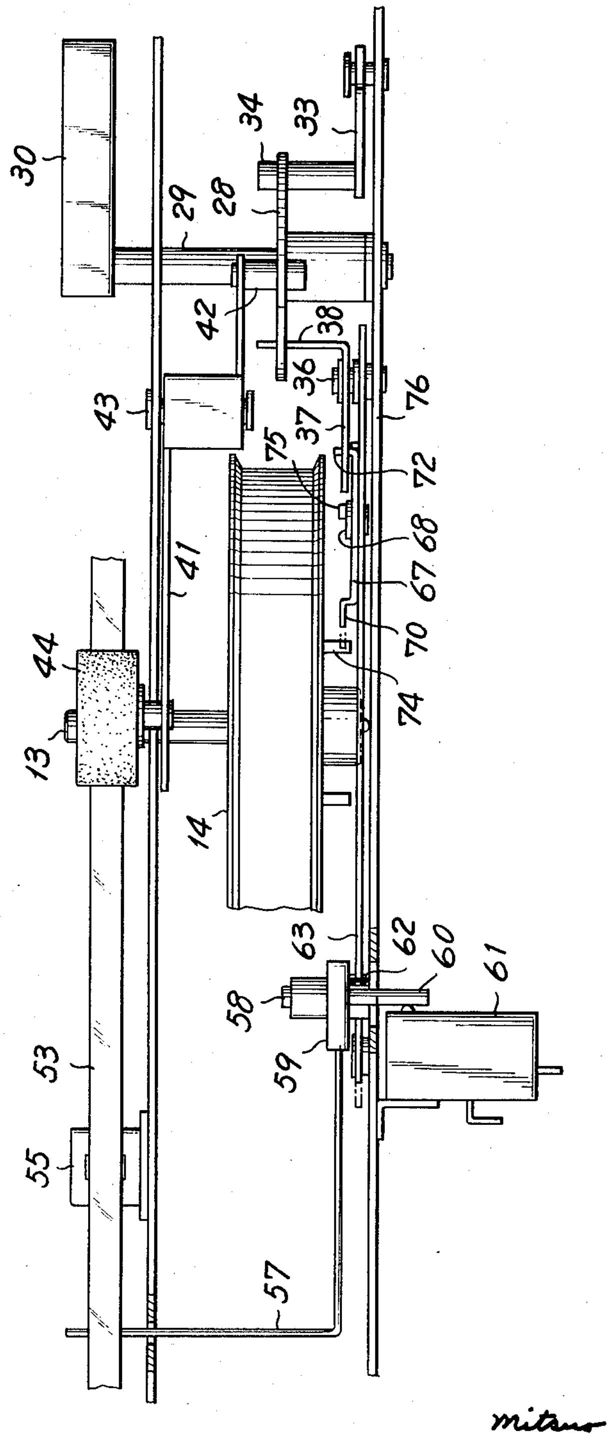
FIG. 2 is a front view of the apparatus as shown in FIG. 1.

Referring now to FIGS. 1 and 2, an embodiment of an automatic operating apparatus according to this invention will be described. A pulley 10 is secured to a motor shaft 11. A belt 12 is held in suspension between the pulley 10 and a flywheel 14 fixed with a capstan 13. A friction wheel 15 integral with the pulley 10 transmits its rotation through an idler 16 to a reel disk 17 as later described. The idler 16 is rotatably provided at a fore end of an idler arm 18. The arm 18 is pivotally mounted on a shaft 22 at an end of a lever 20 which is pivoted about a shaft 19. The arm 18 is urged by a spring 21 provided in suspension between the fore end of the arm 18 and a fixed portion of a chassis in a direction of contact of the idler 16 with the friction wheel 15 and reel disk 17. The lever 20 receives a rotational force from the spring 21. As a bent portion 24 of a pull rod 23 is engaged with a side of the lever 20 and a pawl 27 of a lock lever 26 pivoted on a shaft 25 engages with the shaft 22, the lever 20 is in a position as shown by a full line in the figure.

The pull rod 23 is interlocked with an index cam 28, as is not shown. When an operating knob 30 fixed at a shaft 29 of the cam 28 is in a position "STOP," the cam 28 is in a position as shown in the figure. At this instant, a roller 34 on a lever 33 which is pivotally mounted on a shaft 31 and urged to revolve counterclockwise by a spring 32 fits into a recess of the cam 28. Therefore, the cam 28 is held in a position as shown in the figure. On the peripheral edge of the cam 28 is provided a stepped portion 35. A lock lever 37 pivotally mounted on a shaft 36 has a bent portion 38 urged to revolve clockwise by a spring 39. The cam 28 has a window portion 40 of the shape as shown. A pin 42 provided at one end of a pinch roller arm 41 fits to the window 40.

The pinch roller arm 41 is pivoted on a shaft 43 and has at its middle part a pinch roller 44 which is rotatable. The arm 41 is urged by a spring 45 to revolve in the direction of compression of the pinch roller 44 against the capstan 13.

A pinch roller lock lever 46 is pivotally mounted on a shaft 47. A pawl 48 engaging with a bent portion 49 at the end of the arm 41 is provided in projection on one edge of the lever 46. The lever 46 and the lever 26 are connected to each other by a rod 50. The other edge of the lever 46 is connected with a rod 52 of a plunger 51.

Magnetic tape 53 passes a guide roller 54, a magnetic head 55, the capstan 13 and a guide roller 56 and is provided between a supply reel and a takeup reel. A detecting lever 57 is secured to a lever holder 59 which is pivoted on a shaft 58. The fore end of the lever 57 contacts the inner surface of the magnetic tape 53. The lower surface of the lever holder 59 is provided with a pin 60. A switch 61 inserted in a power source circuit is opened or closed by means of the pin 60. When the lever 57 is restricted of its revolution by the magnetic tape 53 in a position as shown by a full line in the figure, the switch 61 is pushed by the pin 60 and is closed.

A pin 62 which is connected with a slide lever 63 is fixedly provided at one end of the lever holder 59. The slide lever 63 moves in the directions of arrows I and M by guidance of a pin 66 and shaft 36 which respectively fit to slots 64 and 65 provided at both ends of the lever 63. A stop lever 67 is pivotally mounted by a shaft 68 on the lever 63. The stop lever 67 moves by a snap action of a click spring 69 having its ends pivoted on the end of the lever 67 and slide lever 63. The stop lever 67 is provided with two projections 70, 71 and a bent portion 72. The bent portion 72 is located opposite to the side edge of the lock lever 37.

Here, the magnetic tape 53 is set up as shown in the figure. The operating knob 30 is revolved to a recording and reproducing position as designated at "REC, REP" as shown by one dot-chain line. By revolution of the knob 30, the index cam 28 is revolved in the direction of the arrow E so that its stepped portion 35 is revolved to a position as shown by 35a in one dot-chain line. At the instant, the bent portion 38 of the lock lever 37 engages with the stepped portion 35. The cam 28 is then held in its revolved position. Also, by revolution of the cam 28, the pull rod 23 moves in the direction of the arrow L. Thus, the engagement of the bent portion 24 with the idler arm 20 is released. However, the arm 20 is still in engagement with the lock lever 26 and it is in a position as shown by full line. The idler 16 is in a position as shown by full line and remains to be separated from the friction wheel 15 and reel disk 17.

By revolution of the index cam 28, on the other hand, a wider portion 73 of the window 40 moves to a position as shown by 73*a* in one dot-chain line. As the result, the pinch roller arm 41 revolves in the direction of the arrow B by force of the spring 45. The revolution of the arm 41 is restricted by engagement of the bent portion 49 with the pawl 48 of the lever 46. The arm 41 is engaged in its revolved position as shown by double dot-chain line. At this instant, the pinch roller 44 is in a position as shown by 44*a* in double dot-chain line but it does not contact with the tape 53.

The switch 61 is then pushed by the pin 60 of the lever holder 59 and it is closed. As a power source switch (not shown) connected serially with the switch 61 to the power source is opened, the power source circuit is not closed yet in this state and the tape recorder is not in a recording and reproducing condition.

When the above-described power source switch is closed by a timer (not shown) set at a preset time, the power source circuit is closed. Then, the motor with the motor shaft 11 revolves and the plunger 51 is operated. As a consequence, the pinch roller lock lever 46 is pulled in the direction of the arrow F and revolves to a position as shown by one dot-chain line. By revolution of the lever 46, the pawl 48 and the bent portion 49 are released from their mutual engagement. Thus, the pinch roller arm 41 is further revolved in the direction of the arrow B by force of the spring 45. The arm 41 is revolved to a position as shown by one dot-chain line. The pinch roller 44 moves to a position as shown by 44b in one dot-chain line and compresses through the tape 53 against the capstan 13. As the capstan 13 is rotating by transmission of rotation of the motor through the belt 12, the tape 53 held between the capstan 13 and the pinch roller 44 is driven to run.

Simultaneously with the revolution of the pinch roller lock lever 46, the rod 50 is moved in the arrow direction G. The lock lever 26 receives the rotation force of the lever 46 through the rod 50 and revolves to a position as shown by one dot-chain line. By revolution of the lever 26, the pawl 27 is released from engagement with the shaft 22 and the idler arm 20 revolves to a position as shown by one dot-chain line by force of the spring 21. Consequently, the idler 16 moves to a position as shown by one dot-chain line to contact the friction wheel 15 and reel disk 17. The reel disk 17 is transmitted the rotation of the friction wheel 15 through the idler 16 and makes its rotation. By rotation of the reel disk 17, the takeup reel (not shown) rotates and winds up the tape 53 driven by the capstan 13 and pinch roller 44 as above described. Hence, the running tape 53 performs recording or reproducing with the magnetic head 55.

Therefore, if the operating knob 30 is set up at a recording and reproducing position "REC, REP" and the timer is set up to operate at a desired time, the tape recorder can automatically start its recording or reproducing operation.

An automatic stop operation will now be described. When the tape 53 is all wound up on a takeup reel from a supply reel and the recording or reproducing is ended, the tape 53 is not present in the position as shown in the figure. As a consequence, the detecting lever 57, which has been held in a revolved position as shown by full line by the tension of the tape 53 until that time, is then released. By restoring force of the switch 61, the lever 57 with lever holder 59 revolve in the arrow direction H to present a state as shown by one dot-chain line. The switch 61 is thereby opened and the power source circuit of the motor is opened. The revolution of the motor is then stopped.

With the revolution of the lever holder 59, the slide lever 63 connected through the pin 62 to the holder 59 is slid in the direction of the arrow I. By sliding movement of the slide lever 63, the projection 70 of the stop lever 67 moves to a position as shown by 70*a* in one dot-chain line. At this instant, the projection 70 enters in a locus of rotation of a projection 74 provided on the lower surface of the flywheel 14. The flywheel 14 continues its rotation counterclockwise for a while by its own inertia after the power source circuit of the motor is opened. The projection 74 kicks off the projection 70 of the stop lever 67 whereby the stop lever 67 is revolved in the arrow direction J to present a state as shown by double dot-chain line. This revolution of the lever 67 continues by click action as the urging direction of the spring 69 is reversed in the way of the revolution. Its bent portion 72 pushes the lock lever 37 and revolves it counterclockwise.

By revolution of the lock lever 37, the bent portion 38 becomes free from the engagement with the stepped portion 35 of the index cam 28. Since the lever 33 has been urged to revolve counterclockwise in the figure by the spring 32, the cam 28 revolves in the direction of the arrow K by reverse cam action by the roller 34 and again returns to the state as shown. With the returning revolution of the cam 28, the pinch roller arm 41 returns to a position shown by full line by cam action of the window 40 whereby the pinch roller 44 is detached from the capstan 13.

By revolution of the cam 28, the pull rod 23 is pulled in a direction reverse to the direction L so that the idler arm 20 returns to a position shown by full line. Accordingly, the idler 16 is detached from the friction wheel 15 and reel disk 17 whereby the reel disk 17 is stopped of its revolution. Then, the tape recorder wholly stops its operation.

The above description concerns with the transfer action from the recording or reproducing mode to the stopping mode. The stopping may be carried out by the same action as above described when the operating knob 30 is revolved to a position of rewinding as indicated by "REWIND" and the rewinding ends. The same applies to the transfer action from the fast forwarding mode to stopping mode of tape.

When the tape recorder is operated again, the detecting lever 57 may be applied to the tape 53 as shown in the figure. The lever holder 59 is then revolved in the reverse direction of arrow H. Thus, the slide lever 63 slides in the direction of arrow M and the projection 71 of the stop lever 67 contacts the projection 75 on a base plate 76. Consequently, the stop lever 67 revolves in the direction of arrow A. During the revolution, the force of the spring 69 is reversed by click action to return to the state as shown by full line in the figure. Likewise, other parts also return to the initial condition before starting.

As hereinabove described, there is not required manual operation for the index cam immediately before and after recording and reproducing. For instance, if the tape recorder having an automatic operating apparatus of this invention is connected to a radio tuner and if the power source is inserted a timer with preset time, it is well possible to record a desired broadcasting program even during the absence of the operator. In the similar way, the tape recorder may be automatically started and its reproduced sound may be utilized for an alarm purpose.

Figure 3:
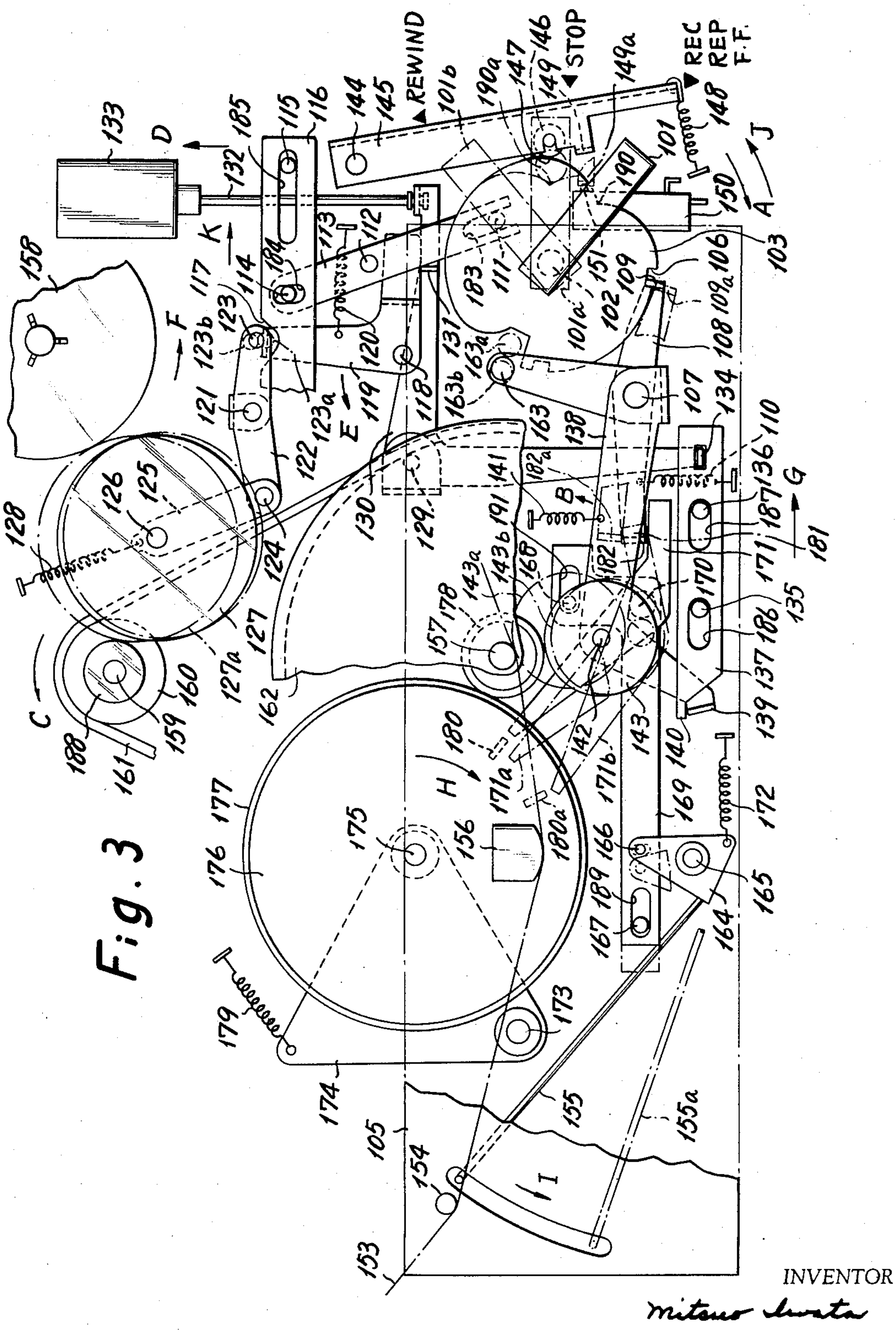
FIG. 3 is a plan view of another embodiment of an automatic operating apparatus of the invention.
Figure 4:
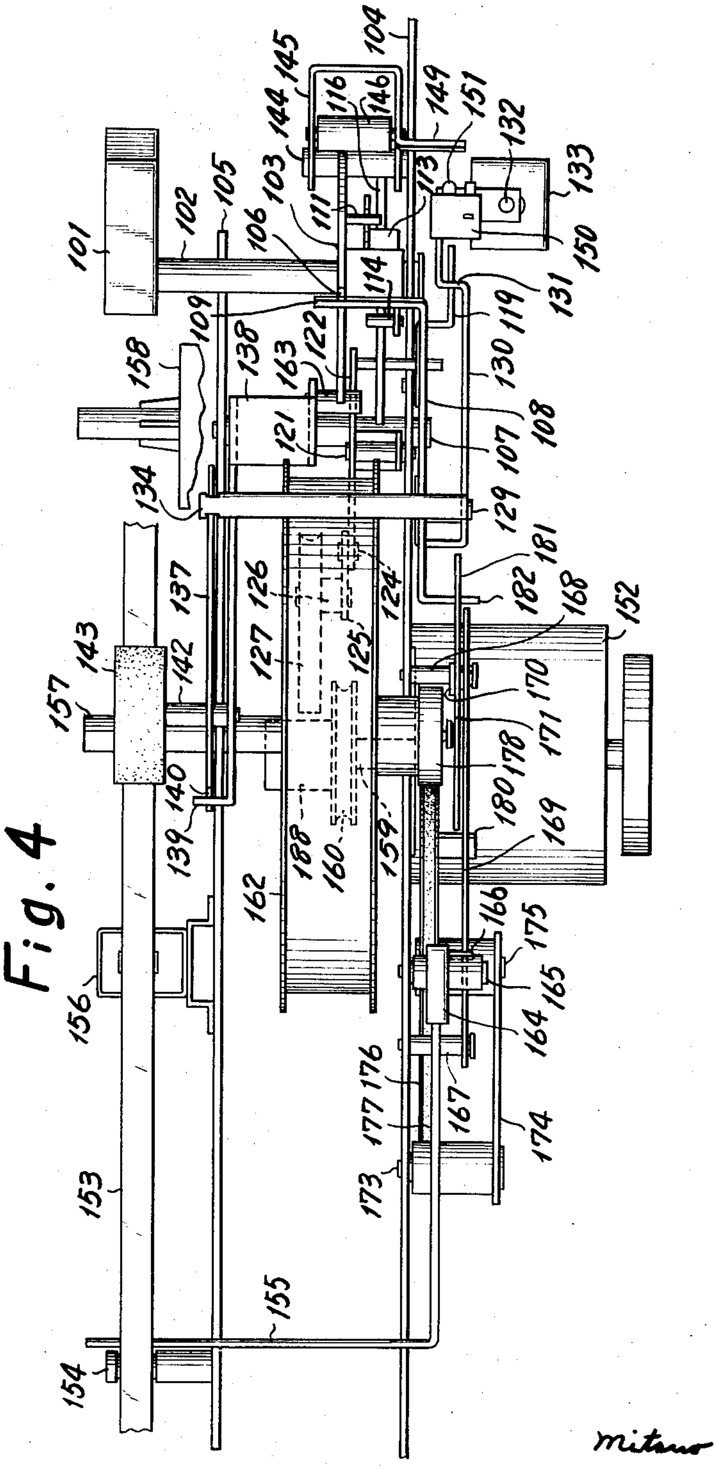
FIG. 4 is a front view of the apparatus as shown in FIG. 3.

With reference to FIGS.3 and 4, another embodiment of the invention will be illustrated.

A shaft 102 of an operating knob 101 is secured with a control cam 103 and rotatably carried by a chassis 104 and a mounting plate 105. If the operating knob 101 is revolved in the direction of arrow A to a position of recording and reproducing as shown by full line in the figure, a bent portion 109 of a lock lever 108 engages with a stepped portion 106 of the cam 103. The lock lever 108 is provided so as to revolve about a shaft 107 and is imparted a rotating force of counterclockwise direction by a spring 110. Thus, the cam 103 and the knob 101 are held at their revolved positions. A connecting lever 113 is pivotally mounted on a shaft 112. A U-shaped groove 183 provided at one end of the lever 113 is fitted with a pin 111 provided on the lower surface of the cam 103. A pin 114 provided on the other end of the lever 113 fits to an opening 184 on a plate cam 116. The plate cam 116 is adapted to slide in the horizontal direction by guidance of a fixed pin 115 fitted to a slot 185. The plate cam 116 is provided with a recess 117 on one edge.

An idler lock lever 119 pivotally mounted by a shaft 118 is energized by a spring 120. An idler lever 122 on a shaft 121 is provided at its end with a pin 123. An idler arm 125 is pivotally mounted by a shaft 124 on the other end of the lever 122. An idler 127 is pivotally mounted by a shaft 126 at the end of the idler arm 125. A spring 128 is held in tension between the fore end of the idler arm 125 and the chassis 104. The idler lever 122 receives a rotating force in the clockwise direction by the spring 128 but the pin 123 is engaged with the fore end of the lever 119 so that the lever 122 is in a position as shown in the figure.

A solenoid connector 130 pivotally mounted by a shaft 129 is engaged to the idler lock lever 119 with a bent portion 131. A rod 132 of a plunger 133 is connected to one end of the solenoid connector 130. The other end of the connector 130 is connected to a pinch roller lock plate 137. The plate 137 is supported to slide in the horizontal direction by the guiding of pins 135 and 136 fitted to slots 186 and 187.

A pinch roller arm 138 is pivotally mounted by a shaft 107 and imparted a rotating force in the direction of arrow. As the bent portion of the arm 138 is engaged with a stepped portion 140 of the plate 137, the arm 138 is engaged in a position as shown in the figure. As the result, the pinch roller 143 on a shaft 142 of the arm 138 is in a position shown by full line and is detached from a capstan 157.

An index arm 145 on a shaft 144 has a roller 146 and it is urged to revolve clockwise by a spring 148. The roller 146 compresses against a projection 147 of the cam 103. Then, a bent portion 149 of the arm 145 is detached from a contact 151 of a micro-switch 150. The micro-switch 150 inserted into the power source circuit of a motor 152 has been closed. However, the timer switch (not shown) inserted into the power source circuit serially with the micro-switch 150 has been opened whereby the motor 152 has been stopped.

A magnetic tape 153 is applied between a supply reel and a takeup reel passing a tape guide 154, a magnetic head 156 and a capstan 157. Parts (not shown) such as the reel brake associated with the plate cam 116 are in states possible to run the tape at a normal speed.

When it reaches a preset time as previously set up in the timer, the timer switch is closed. The power source circuit of the motor is closed through the micro-switch already closed. Thus, the motor 152 starts its rotations. By the rotation of the motor 152, a motor pulley 160 and a friction wheel 188 fixed at a motor shaft 159 rotate in the direction of arrow C at a normal speed. The rotation of the motor pulley 160 is transmitted to a flywheel 162 with capstan 157 through a belt 161 so that the capstan 157 rotates at a normal speed.

Simultaneously, the power source circuit of the plunger 133 is closed and the rod 132 moves in the direction of arrow D by a force larger than the sum of forces of the springs 120 and 141. The solenoid connector 130 is revolved counterclockwise whereby the idler lock lever 119 is revolved in the direction of arrow E against force of the spring 120. By revolution of the lever 119, the pin 123 becomes free from engagement with the end of the lever 119 and the lever 122 is released from engagement. Therefore, the lever 122 revolves clockwise by force of the spring 128. The idler 127 reaches a position shown by 127*a* and contacts a friction wheel 188 and a reel disk 158. The reel disk 158 is transmitted the rotation of the motor shaft 159 through the idler 127 and rotates in the direction of arrow F. Accordingly, the takeup reel on the reel disk 158 winds up the tape 153.

By counterclockwise revolution of the solenoid connector 130, the pinch roller lock plate 137 slides in the direction of arrow G. By sliding of the plate 137, the engagement of the bent portion 139 with the stepped portion 140 is released. The pinch roller arm 138 revolves in the direction of arrow B by force of the spring 141. By revolution of the arm 138, a pin 163 provided on its end moves to a position shown by 163*a*. Also, by revolution of the arm 138, the pinch roller 143 moves to a position shown by 143a and contacts the capstan 157 through the tape 153. The tape 153 is held between the pinch roller 143 and the rotating capstan 157 and is driven and run at a normal speed from the supply reel to the takeup reel. Thus, the running tape 153 makes recording or reproducing by the magnetic head 156. The starting operation of the recording or reproducing mode is thus automatically performed.

An automatic stopping operation is now described. A lever holder 164 having a detecting lever 155 thereon is pivotally mounted by a shaft 165. The lever holder 164 is connected through a pin 166 to a slide lever 169. The lever 169 guided by pins 167 and 168 fitted to slots 189 and 191 is adapted to slide in the horizontal direction. An action lever 171 is pivotally mounted by a shaft 170 on the lever 169. A spring 172 is held in tension between the lever holder 164 and the fixed part of the chassis.

While the tape is running, the tension of the tape is larger than the force of the spring 172, so that the detecting lever 155 and the lever holder 164 are respectively in the positions as shown by full line in the figure. Accordingly, the slide lever 169 and action lever 171 are in the positions as shown by full line in the figure.

A plate 174 pivoted by a shaft 173 carries a pulley 176 pivotally mounted by a shaft 175. A belt tire 177 provided on the outer periphery of the pulley 176 compresses the tire 178 coaxial with the flywheel 162 by force of a spring 179. During running of the tape at a normal speed, the pulley 176 is transmitted the rotation from the tire 178 and rotates at a reduced speed lower than that of the flywheel 162. In this state of operation, a pin 180 on the lower surface of the pulley 176 does not contact the fore end of the action lever 171.

As the recording or reproducing are ended after the tape 153 is wound up on the takeup reel and the tape to which the detecting lever 155 has contacted is absent, the detecting lever 155 revolves to a position shown by 155a by one dot-chain line in the direction of arrow I by tension of the spring 172. With the revolution of the detecting lever 155, the lever holder 164 revolves. The slide lever 169 moves to a position shown by one dot-chain line leftwardly in the figure. By sliding of the lever 169, the action lever 171 moves to a position shown by 171a in one dot-chain line. The speed of movement of this action lever 171 is preferably set up larger than the peripheral speed of rotation of a pin 180 provided on the pulley 176. By rotating force of the pin 180 rotating from a position shown by 180 to a position shown by 180*a*,the action lever 171 is pushed at the fore end by the pin 180 and revolves from a position shown by 171*a* to a position shown by 171*b*. By counterclockwise revolution of the action lever 171, the other end 181 of the lever 171 pushes a bent portion 182 of the lock lever 108 against force of the spring 110 to revolve the lever 108 clockwise to a position shown by 182*a*.

By revolving of the lock lever 108, its bent portion 109 revolves to a position shown by 109 *a* and is released from engagement with a stepped portion 106 of the control cam 103. The control cam 103 is pushed by the roller 146 of the index arm 145 which is urged to rotate clockwise by the spring 148 and revolves in the direction of arrow J. By revolving of the control cam 103, its recess 190 revolves to a position shown by 190*a*. Accordingly, the operating knob 101 returns to a position "STOP" shown by 101*a*.

As the result, the pin 163 of the pinch roller arm 138 is moved to a position shown by 163*b* and the pinch roller 143 is moved to a position shown by 143*b*. By revolving of the control cam 103, the plate cam 116 slides in the direction of arrow K through the pin 111, connecting lever 113 and pin 114. As the plate cam 116 slides, the pin 123 is pushed by an inclination cam part of the recess 117 of the plate cam 116. The idler lever 122 is revolved counterclockwise and the pin 123 moves to a position shown by 123*b* allowing the lever 119 to return freely to its initial position. The brake associated with the plate cam 116 and other parts also return to the previous stop position.

Also, the bent portion 149 moves to a position shown by 149a by revolving of index arm 145 and pushes the contact 151 of the micro-switch 150. Thereby, the micro-switch 150 is opened and the power source circuit of the motor is opened so that the rotations of the motor is stopped.

The above described serial operation makes it possible to return all tape recorder mechanisms to a stop condition. By use of a timer thereafter, the power source circuit of the tape recorder can be opened.

In another case, the operating knob 101 may be revolved to a rewinding position as shown by 101*b* to perform a tape rewinding. When the rewinding operation of the tape is ended and the tape is wholly wound up, the tape recorder can be stopped automatically by the similar action as above described. The same operation applies also to anyone of the recording, reproducing, fast forwarding and rewinding modes and the same action will make all parts fully stopped in the same manner if the operating knob 101 is manually revolved to a stop position during operation.

While the present invention has been described with reference to a few particular embodiments, it is to be understood that these embodiments are only for illustrative purpose and the present invention may have various modifications and changes without departing from the spirit and the scope of the invention as defined by the appended claims.

What I claim is:

1. An automatic operating apparatus for a magnetic recording and reproducing apparatus comprising a cam integral with and revolving by revolution of an operating knob, means for urging said cam always to return in rotation to a stop position, means for engaging with the cam rotated before automatic starting of said magnetic recording and reproducing apparatus against force of said urging means, a pinch roller which is capable of contacting a capstan for driving a magnetic tape, an idler for driving a reel disk, means for engaging said pinch roller and idler in a position of waiting in association with the revolution of said cam, a timer switch for closing a power source circuit at a preset time, and a plunger means operating by closing of said timer switch and releasing said pinch roller and idler from a position of waiting to a position of action.

2. The automatic operating apparatus of claim 1, which further comprises means for detecting presence or absence of said magnetic tape and means actuated by detection of absence of the magnetic tape by said detecting means and releasing engagement of said cam engaging means, wherein said cam released of said engagement is returned in rotation to the stop position by said urging means.

3. The automatic operating apparatus of claim 2, which further comprises a lever means which rotatably carries said pinch roller, said lever means having a portion in contact with said cam and revolves by returning revolution of said cam to separate said pinch roller from said capstan.

4. The automatic operating apparatus of claim 2, in which said engagement releasing means comprises a lever movable by detection of said detecting means, a revolvable lever pivotally mounted on said lever, a rotating member rotatable by its inertia for a while after opening of a power source circuit of a motor, and a projection provided on said rotating member abutting said revolvable lever which has moved during rotation due to inertia of said rotating member, wherein said revolvable lever is revolved by said projection so as to release the engagement of said cam engaging means.

5. The automatic operating apparatus of claim 1, in which said cam has a non-circular curved portion and said urging means comprises a lever means always compressing the peripheral edge of said cam and urging said cam to rotate along said non-circular curved portion.

6. The automatic operating apparatus of claim 4, in which said magnetic recording and reproducing apparatus has a single drive motor, said capstan and said reel disk being transmitted a rotating force from said motor and rotated and said rotating member rotating by its inertia for a while after opening of the power source circuit of said motor.

* * * * *